United States Patent
Bai et al.

(10) Patent No.: US 11,171,750 B2
(45) Date of Patent: Nov. 9, 2021

(54) PER BEAM WAVEFORM SELECTION

(71) Applicant: QUALCOMM Incorporated, San Diego, CA (US)

(72) Inventors: Tianyang Bai, Bridgewater, NJ (US); Juergen Cezanne, Ocean Township, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/929,053

(22) Filed: Jul. 14, 2020

(65) Prior Publication Data

US 2021/0036817 A1    Feb. 4, 2021

Related U.S. Application Data

(60) Provisional application No. 62/882,319, filed on Aug. 2, 2019.

(51) Int. Cl.
*H04L 5/00* (2006.01)
*H04W 72/04* (2009.01)
(Continued)

(52) U.S. Cl.
CPC ......... *H04L 5/0023* (2013.01); *H04B 7/0404* (2013.01); *H04B 7/063* (2013.01);
(Continued)

(58) Field of Classification Search
CPC ... H04L 5/0023; H04B 7/0404; H04B 7/0617; H04B 7/063; H04W 72/042; H04W 72/046
(Continued)

(56) References Cited

U.S. PATENT DOCUMENTS 10,523,358 B1 * 12/2019 Park ................ H04B 7/063
2018/0227094 A1 * 8/2018 Liu .................. H04L 5/0094
(Continued)

FOREIGN PATENT DOCUMENTS

EP        3518433 A1 *  7/2019   ............... H04B 7/06

OTHER PUBLICATIONS

Interdigital Inc: "On Power Control Processes for Multi Beam Transmission in NR," 3GPP Draft, 3GPP TSG RAN WG1 Meeting #89, R1-1708361, On Power Control Processes for Multi Beam Transmission in NR, 3rd Generation Partnership Project (3GPP), Mobile Competence Centre, 650, Route Des Lucioles, F-06921, Sophia-Antipolis Cedex, France, vol. RAN WG1. No. Hangzhou. China; May 15, 2017-May 19, 2017, May 14, 2017 (May 14, 2017), XP051273554, 4 pages, Retrieved from the Internet: URL: http://www.3gpp.org/ftp/Meetings_3GPP_SYNC/RAN1/Docs/ [retrieved on May 14, 2017] the whole document.
(Continued)

*Primary Examiner* — Hirdepal Singh
(74) *Attorney, Agent, or Firm* — Danai Nelisile Mhembere; Holland & Hart LLP

(57) ABSTRACT

Methods, systems, and devices for wireless communications are described. A user equipment (UE) may receive, from a base station, control signaling configuring the UE to use a first waveform for communicating via a first beam and a second waveform for communicating via a second beam, the first waveform being different than the second waveform. The UE may communicate a first data transmission via the first beam using the first waveform and communicate a second data transmission via the second beam using the second waveform.

25 Claims, 15 Drawing Sheets

(51) Int. Cl.
*H04B 7/0404* (2017.01)
*H04B 7/06* (2006.01)

(52) U.S. Cl.
CPC ........ *H04B 7/0617* (2013.01); *H04W 72/042* (2013.01); *H04W 72/046* (2013.01)

(58) Field of Classification Search
USPC .......................................................... 375/267
See application file for complete search history.

(56) References Cited

U.S. PATENT DOCUMENTS

| 2018/0368081 | A1 | 12/2018 | Akkarakaran et al. | |
| 2020/0037254 | A1* | 1/2020 | Comsa | H04W 52/265 |
| 2020/0067590 | A1* | 2/2020 | Wang | H04B 7/0632 |
| 2020/0068539 | A1* | 2/2020 | Liu | H04L 5/0007 |
| 2020/0163024 | A1* | 5/2020 | Li | H04W 52/38 |

OTHER PUBLICATIONS

International Search Report and Written Opinion—PCT/US2020/042180—ISA/EOP—dated Oct. 9, 2020.

* cited by examiner

SC-FDM Waveform 215

OFDMA Waveform 220

PER BEAM WAVEFORM SELECTION

CROSS REFERENCE

The present Application for Patent claims the benefit of U.S. Provisional Patent Application No. 62/882,319 by BAI et al., entitled "PER BEAM WAVEFORM SELECTION," filed Aug. 2, 2019, assigned to the assignee hereof, and expressly incorporated by reference herein.

BACKGROUND

The following relates generally to wireless communications, and more specifically to per beam waveform selection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE and a base station may communicate using beamformed transmissions. In some cases, the UE and the base station may communicate using different types of waveforms for data transmissions. Techniques for selecting a waveform for beamformed communications can be improved.

SUMMARY

The described techniques relate to improved methods, systems, devices, and apparatuses that support per beam waveform selection. Generally, the described techniques provide for a user equipment (UE) to communicate using different waveforms for different beams based on channel characteristics of the beams. The UE and base station may support beamformed communications using one or more different types of waveforms, such as orthogonal frequency division multiplexed (OFDM) waveforms and single carrier frequency division multiplexed (SC-FDM) waveforms. The efficient waveform for data transmissions may be based on channel characteristics, such as whether the channel has frequency selective fading. Therefore, whether data transmissions are made using an SC-FDM waveform or an OFDM waveform may be based on characteristics of the channel. Additionally, different beams of the base station may have different channel characteristics, such as delay spread and frequency selectivity in fading. For example, beams with a direct line-of-sight to the receiver may have flatter fading over a frequency range, where beams which are not line-of-sight may generally have more frequency selective fading. Therefore, a UE and a base station may communicate data transmissions using different waveforms for different beams based on characteristics of the channel.

A method of wireless communications by a UE is described. The method may include receiving, from a base station, control signaling configuring the UE to use a first waveform for communicating via a first beam and a second waveform for communicating via a second beam, the first waveform being different than the second waveform, communicating a first data transmission via the first beam using the first waveform, and communicating a second data transmission via the second beam using the second waveform.

An apparatus for wireless communications by a UE is described. The apparatus may include a processor, memory coupled with the processor, and instructions stored in the memory. The instructions may be executable by the processor to cause the apparatus to receive, from a base station, control signaling configuring the UE to use a first waveform for communicating via a first beam and a second waveform for communicating via a second beam, the first waveform being different than the second waveform, communicate a first data transmission via the first beam using the first waveform, and communicate a second data transmission via the second beam using the second waveform.

Another apparatus for wireless communications by a UE is described. The apparatus may include means for receiving, from a base station, control signaling configuring the UE to use a first waveform for communicating via a first beam and a second waveform for communicating via a second beam, the first waveform being different than the second waveform, communicating a first data transmission via the first beam using the first waveform, and communicating a second data transmission via the second beam using the second waveform.

A non-transitory computer-readable medium storing code for wireless communications by a UE is described. The code may include instructions executable by a processor to receive, from a base station, control signaling configuring the UE to use a first waveform for communicating via a first beam and a second waveform for communicating via a second beam, the first waveform being different than the second waveform, communicate a first data transmission via the first beam using the first waveform, and communicate a second data transmission via the second beam using the second waveform.

Some examples of the method, apparatuses, and non-transitory computer-readable medium described herein may further include operations, features, means, or instructions for communicating using the first waveform via a first beam group including a first set of beams, and communicating using the second waveform via a second beam group including a second set of beams.

Some examples of the method, apparatuses, and non-transitory computer-readable medium described herein may further include operations, features, means, or instructions for receiving, from the base station, a configuration for the first beam group and the second beam group.

In some examples of the method, apparatuses, and non-transitory computer-readable medium described herein, each beam associated with a transmission reception point (TRP) of the base station may be associated with either the first waveform and the first beam group or the second waveform and the second beam group.

In some examples of the method, apparatuses, and non-transitory computer-readable medium described herein, each beam associated with an antenna panel at the UE may be associated with either the first waveform and the first beam group or the second waveform and the second beam group.

In some examples of the method, apparatuses, and non-transitory computer-readable medium described herein, each beam associated with a transmission/reception spatial filter at the UE may be associated with either the first waveform and the first beam group or the second waveform and the second beam group.

In some examples of the method, apparatuses, and non-transitory computer-readable medium described herein, receiving the control signaling may include operations, features, means, or instructions for receiving the control signaling that indicates a first transmission configuration indicator (TCI) state for the first beam and a second TCI state for the second beam.

Some examples of the method, apparatuses, and non-transitory computer-readable medium described herein may further include operations, features, means, or instructions for transmitting feedback information to the base station, where the control signaling may be received based on the feedback information.

In some examples of the method, apparatuses, and non-transitory computer-readable medium described herein, transmitting the feedback information may include operations, features, means, or instructions for transmitting the feedback information that indicates a delay spread measurement, a frequency selectivity per beam parameter, a UE capability, a power amplifier capability, a waveform recommendation, or any combination thereof.

In some examples of the method, apparatuses, and non-transitory computer-readable medium described herein, the control signaling may be downlink control information, radio resource control signaling, a medium access control (MAC) control element (CE), or any combination thereof.

In some examples of the method, apparatuses, and non-transitory computer-readable medium described herein, communicating the first data transmission may include operations, features, means, or instructions for receiving, via a first antenna panel of the UE, the first data transmission via the first beam using the first waveform, where the second data transmission may be received via a second antenna panel of the UE that differs from the first antenna panel.

In some examples of the method, apparatuses, and non-transitory computer-readable medium described herein, the UE concurrently communicates the first data transmission via the first beam and the second data transmission via the second beam.

In some examples of the method, apparatuses, and non-transitory computer-readable medium described herein, the first waveform may be a orthogonal frequency division multiplexing waveform or a single carrier frequency division multiplexing waveform.

In some examples of the method, apparatuses, and non-transitory computer-readable medium described herein, the second waveform may be a orthogonal frequency division multiplexing waveform or a single carrier frequency division multiplexing waveform.

A method of wireless communications by a base station is described. The method may include transmitting control signaling to configure a UE to use a first waveform for communicating via a first beam and a second waveform for communicating via a second beam, the first waveform being different than the second waveform, communicating a first data transmission via the first beam using the first waveform, and communicating a second data transmission via the second beam using the second waveform.

An apparatus for wireless communications by a base station is described. The apparatus may include a processor, memory coupled with the processor, and instructions stored in the memory. The instructions may be executable by the processor to cause the apparatus to transmit control signaling to configure a UE to use a first waveform for communicating via a first beam and a second waveform for communicating via a second beam, the first waveform being different than the second waveform, communicate a first data transmission via the first beam using the first waveform, and communicate a second data transmission via the second beam using the second waveform.

Another apparatus for wireless communications by a base station is described. The apparatus may include means for transmitting control signaling to configure a UE to use a first waveform for communicating via a first beam and a second waveform for communicating via a second beam, the first waveform being different than the second waveform, communicating a first data transmission via the first beam using the first waveform, and communicating a second data transmission via the second beam using the second waveform.

A non-transitory computer-readable medium storing code for wireless communications by a base station is described. The code may include instructions executable by a processor to transmit control signaling to configure a UE to use a first waveform for communicating via a first beam and a second waveform for communicating via a second beam, the first waveform being different than the second waveform, communicate a first data transmission via the first beam using the first waveform, and communicate a second data transmission via the second beam using the second waveform.

Some examples of the method, apparatuses, and non-transitory computer-readable medium described herein may further include operations, features, means, or instructions for communicating using the first waveform via a first beam group including a first set of beams, and communicating using the second waveform via a second beam group including a second set of beams.

Some examples of the method, apparatuses, and non-transitory computer-readable medium described herein may further include operations, features, means, or instructions for transmitting, to the UE, a configuration for the first beam group and the second beam group.

In some examples of the method, apparatuses, and non-transitory computer-readable medium described herein, each beam associated with a transmission reception point (TRP) of the base station may be associated with either the first waveform and the first beam group or the second waveform and the second beam group.

In some examples of the method, apparatuses, and non-transitory computer-readable medium described herein, each beam associated with an antenna panel at the UE may be associated with either the first waveform and the first beam group or the second waveform and the second beam group.

In some examples of the method, apparatuses, and non-transitory computer-readable medium described herein, each beam associated with a transmission/reception spatial filter at the UE may be associated with either the first waveform and the first beam group or the second waveform and the second beam group.

In some examples of the method, apparatuses, and non-transitory computer-readable medium described herein, transmitting the control signaling may include operations, features, means, or instructions for transmitting the control signaling that indicates a first transmission configuration indicator (TCI) state for the first beam and a second TCI state for the second beam.

In some examples of the method, apparatuses, and non-transitory computer-readable medium described herein, the base station concurrently communicates the first data transmission via the first beam and the second data transmission via the second beam.

Some examples of the method, apparatuses, and non-transitory computer-readable medium described herein may further include operations, features, means, or instructions for receiving feedback information from the UE, where the control signaling may be transmitted based on the feedback information.

In some examples of the method, apparatuses, and non-transitory computer-readable medium described herein, receiving the feedback information may include operations, features, means, or instructions for receiving the feedback information that indicates a delay spread measurement, a frequency selectivity per beam parameter, a UE capability, a power amplifier capability, a waveform recommendation, or any combination thereof.

In some examples of the method, apparatuses, and non-transitory computer-readable medium described herein, the control signaling may be downlink control information, radio resource control signaling, a medium access control (MAC) control element (CE), or any combination thereof.

In some examples of the method, apparatuses, and non-transitory computer-readable medium described herein, the first waveform may be a orthogonal frequency division multiplexing waveform or a single carrier frequency division multiplexing waveform.

In some examples of the method, apparatuses, and non-transitory computer-readable medium described herein, the second waveform may be a orthogonal frequency division multiplexing waveform or a single carrier frequency division multiplexing waveform.

DETAILED DESCRIPTION

A user equipment (UE) and a base station may communicate using beamformed transmissions. For example, the base station may directionally communicate using one or more base station beams, and the UE may directionally communicate using one or more UE beams. In some cases, a base station beam and a UE beam may directionally point toward each other and be paired together for communications. The UE may be configured with one or more beam pair links to communicate with the base station. The wireless devices may communicate using one or more different types of waveforms. For example, a wireless communications system may support both orthogonal frequency division multiplexed (OFDM) waveforms and single carrier frequency division multiplexed (SC-FDM) waveforms for uplink transmissions from the UE.

In some wireless communications systems, a base station may generally transmit using an OFDM waveform. However, for some higher frequency mmW bands, it may be beneficial to use an SC-FDM waveform for downlink shared channel transmission. For example, a signal with an SC-FDM waveform may be transmitted using a higher average transmit power than an OFDM waveform at high frequencies. However, if the channel used to transmit the signal has frequency selective fading, some advantages of the SC-FDM waveform may be lost. Therefore, whether the base station should use an SC-FDM waveform or an OFDM waveform may be based on characteristics of the channel. Additionally, different beams of the base station may have different channel characteristics, such as delay spread and frequency selectivity in fading. For example, a first beam may have a direct line-of-sight to the UE, resulting in flat fading over a frequency range, where a second beam may not have a direct line-of-sight and may have frequency selective fading. Therefore, the base station may use different waveforms for communications on different beams. For example, the base station, communicating with the UE, may transmit a downlink shared channel signal on a first beam using an SC-FDM waveform and transmit a downlink shared channel signal on a second beam using an OFDMA waveform. In some cases, the transmissions on the first and second beams using the different waveforms may occur at the same time, or both beams may be active and configured for the different waveforms.

Aspects of the disclosure are initially described in the context of a wireless communications system. Aspects of the disclosure are further illustrated by and described with reference to apparatus diagrams, system diagrams, and flowcharts that relate to per beam waveform selection.

Figure 1:
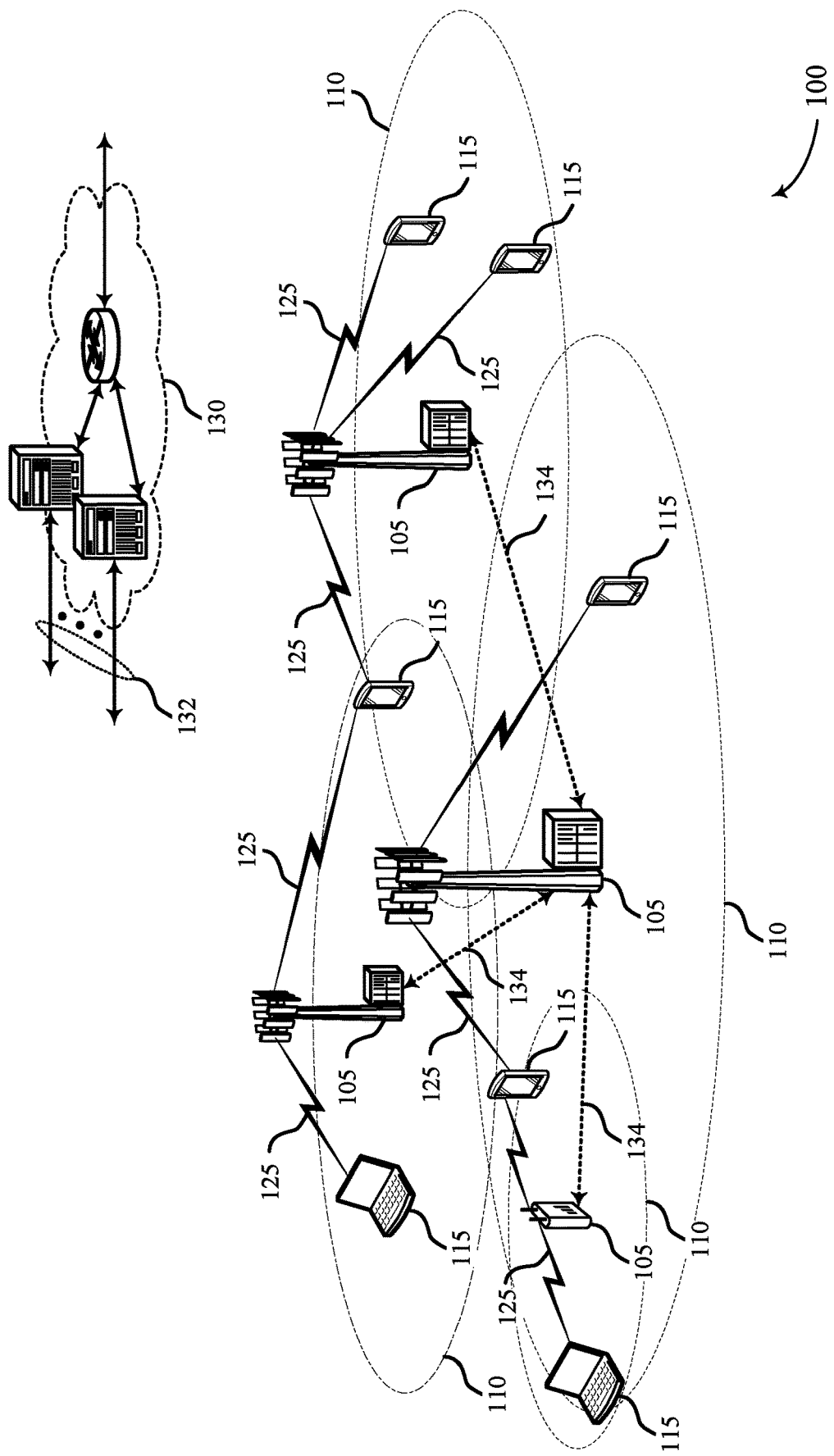
FIG. 1 illustrates an example of a system for wireless communications that supports per beam waveform selection in accordance with aspects of the present disclosure.

FIG. 1 illustrates an example of a wireless communications system 100 that supports per beam waveform selection in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 and a base station 105 may communicate using different waveforms for different beams based on channel characteristics of the beams. The UE 115 and base station 105 may support beamformed communications using one or more different types of waveforms, such as OFDM waveforms and SC-FDM waveforms. The efficient waveform for data transmissions may be based on channel characteristics, such as whether the channel has frequency selective fading. Therefore, whether data transmissions are made using an SC-FDM waveform or an OFDM waveform may be based on characteristics of the channel. Additionally, different beams of the base station 105 may have different channel characteristics, such as delay spread and frequency selectivity in fading. For example, beams with a direct line-of-sight to the receiver may have flat fading, where beams which are not line-of-sight may generally have more frequency selective fading in flat fading. Therefore, a UE 115 and a base station 105 may communicate data transmissions using different waveforms for different beams.

Figure 2:
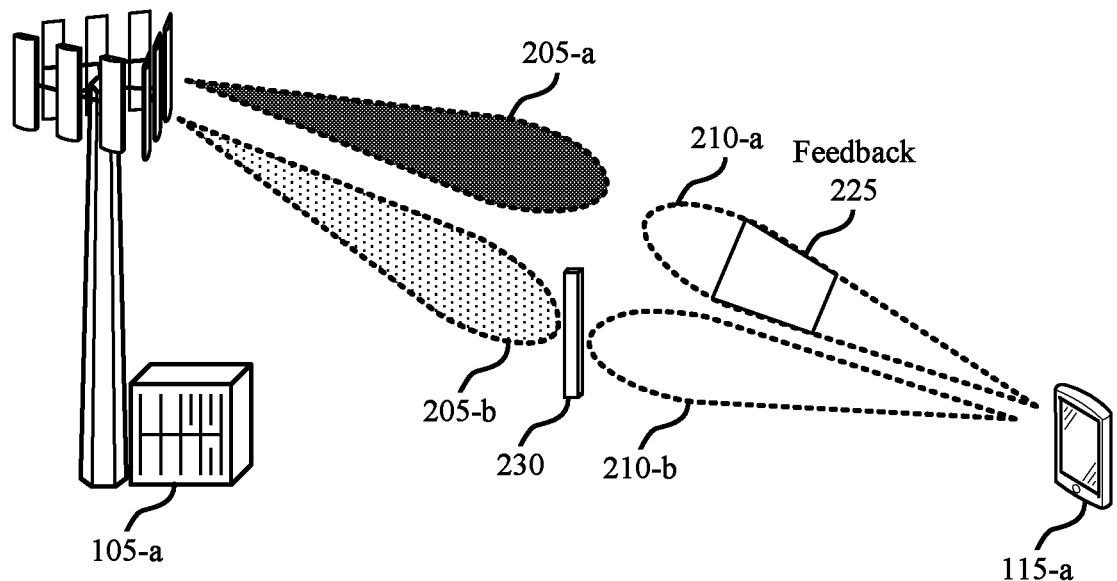
FIG. 2 illustrates an example of a wireless communications system in accordance with aspects of the present disclosure.
Figure 2:
Figure 2:
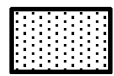

FIG. 2 illustrates an example of a wireless communications system 200 that supports per beam waveform selection in accordance with aspects of the present disclosure. In some examples, wireless communications system 200 may implement aspects of wireless communication system 100. The wireless communications system may include base station 105-*a* and UE 115-*a*, which may be examples of the corresponding devices described with respect to FIG. 1. In some implementations, UE 115-*a* and base station 105-*a* may operate in a mmW spectrum and/or using NR technologies.

UE 115-*a* and base station 105-*a* may communicate using beamformed transmissions. For example, base station 105-*a* may directly communicate with UE 115-*a* using one or more base station beams 205, and UE 115-*a* may directionally communicate using one or more UE beams 210. In one example, base station 105-*a* may directionally transmit toward UE 115-*a* on base station beams 205-*a* and 205-*b*, and UE 115-*a* may directionally monitor for the transmissions using UE beams 210-*a* and 210-*b*. Each base station beam 205 may be associated with a transmission configuration indicator (TCI) state. In some cases, each base station beam 205 may have a different TCI state. The TCI state for a base station beam 205 may correspond to a synchronization signal block (SSB) which is transmitted on the base station beam 205.

In some cases, a base station beam 205 and a UE beam 210 may directionally point towards each other and be paired together for communications. UE 115-*a* may be configured with one or more beam pair links to communicate with base station 105-*a*. For example, UE beam 210-*a* and base station beam 205-*a* may be a first beam pair link, and UE beam 210-*b* and base station beam 205-*b* may be a second beam pair link.

A wireless device in the wireless communications system 200 may transmit using one or more waveforms. For example, the wireless communications system may support both OFDM and SC-FDM waveforms for uplink transmissions from UE 115-*a*. In some examples, SC-FDM may be referred to as DFT-spread-OFDM. Techniques for generating an OFDM waveform and an SC-FDM waveform are described with reference to FIG. 3.

In some cases, base station 105-*a* may configure the waveform used for uplink communications. For example, base station 105-*a* may configure the waveform (e.g., between OFDM and SC-FDM) based on an RRC parameter. When configuring an RRC connection or updating the RRC connection, UE 115-*a* may utilize a waveform for uplink shared channel (e.g., PUSCH) communications as indicated in the received RRC parameter. The indicated waveform may be applied and used for uplink shared channel transmissions on any UE beam 210. In some cases, "transformprecodingenabled" may be an example of the RRC parameter.

In some wireless communications systems, a base station 105 may generally transmit using just an OFDM waveform. Time domain signals generated with an OFDM waveform generally have a high peak-to-average power ratio (PAPR). A large PAPR may lead to a large power backoff from a power amplifier at the transmitter, and may result in the transmitter using a lower average transmission power (e.g., lower maximum average transmission power). However, for some higher frequency mmW bands, it may be beneficial to use an SC-FDM waveform for downlink shared channel transmission. Some power amplifiers may have a lower efficiency at higher frequencies, and SC-FDM waveforms may have a lower PAPR property. Some examples of higher frequency bands may be, for example, Frequency Range 4 (FR4), or frequencies which exceed 52.6 Gigahertz.

SC-FDM waveforms may generally have a smaller PAPR, so when using the same power amplifier, SC-FDM waveforms may have a larger average Tx power (e.g., as the SC-FDM waveform may not introduce the large power backoff). However, SC-FDM waveforms may have a higher implementation complexity. To generate a signal with an SC-FDM waveform, the transmitter may perform a DFT (e.g., not performed for OFDM waveforms), and the receiver may perform an inverse discrete Fourier transform (IDFT). Additionally, SC-FDM may have a smaller channel capacity than OFDM for frequency selective fading channels. However, SC-FDM and OFDM may have the same capacity in a flat fading channel. The gap in channel capacity may increase when the fading is more frequency selective. A smaller channel capacity may lead to a larger error rate when transmitting the same transport block at the same SNR. Additionally, when operating with a smaller channel capacity, a wireless device may only transmit a smaller transport block size or may transmit with a larger power if targeting the same error rate.

Therefore, SC-FDM may have some advantages over OFDM for a flat fading channel, even if SC-FDM is more complex. With the same power amplifier, signals with an SC-FDM waveform may also allow for a larger average transmission power and therefore larger SNR. The channel capacity for the two waveforms may be the same at the same SNR, so SC-FDM may be able to achieve a larger channel capacity since SC-FDM can have a larger SNR. For a frequency selective channel, some of the efficiencies of the SC-FDM waveform may diminish based on how frequency selective the channel is. In some examples, even if SC-FDM can allow for a larger transmission power, the lower channel capacity may lead to a loss of achievable rate in a very frequency selective fading channel. Also, a size of a configured bandwidth may impact which type of waveform to select, as a smaller bandwidth may tend to experience flat fading whereas a larger bandwidth may experience frequency selecting fading.

Therefore, the efficient waveform for transmissions on a downlink shared channel may be based on the channel profile. Frequency selectivity in fading may be determinable based on a delay spread of the beam pair link. For a line-of-sight beam pair link, there may be few multi-path taps (e.g., which may introduce delay), so the fading may be flat in frequency. For non-line of sight links, there may be multiple taps, or sources of delay, which may lead to frequency-selective fading. As such, different beams may have different delay spreads and different frequency selectivity in fading. For example, the first beam pair link with base station beam 205-*a* and UE beam 210-*a* may be line-of-sight and therefore have flat fading.

The second beam pair link with base station beam 205-*b* and UE beam 210-*b* may have, for example, an obstruction 230 between UE 115-*a* and base station 105-*a*, so the second beam pair link may not be line-of-sight and may have frequency-selective fading.

In some cases, different beams may have different channel characteristics. Therefore, it may be efficient for different beams to use different waveforms. As described above, since base station beam 205-*b* may have frequency-selective fading, base station 105-*b* may use an OFDMA waveform. Base station beam 205-*a*, having a line-of-sight to UE 115-*a*, may have flat fading and therefore experience some advantages to using an SC-FDM waveform. Techniques described herein support a UE 115 to communicate with a base station 105 using two or more beam pair links, where at least two of the base station beams 205 use different waveforms.

In some cases, beams which correspond to different TCI states may use different waveforms. For example, base station beam 205-*a* may correspond to a first TCI state and use an SC-FDM waveform 215, and base station beam 205-*b* may correspond to a second, different TCI state and use an OFDMA waveform 220. In some examples, different beams may correspond to beams received by different UE panels or UE antenna arrays. For example, UE 115-*a* may receive a signal with a first waveform transmitted on a first beam at a first UE panel. UE 115-*a* may also receive a signal with a second waveform transmitted on a second beam at a second UE panel. The base station beams 205 which are used to transmit signals which are received at different UE panels may be examples of different beams.

Additionally, or alternatively, beams from one transmission/reception point (TRP) may all use a common waveform. In some cases, different TRPs may be associated with different waveforms. Different TRPs may have different distances to UE 115-*a*, which may result in different delay profiles. Base station beam 205-*a* may be from a first TRP of base station 105-*a*, and base station beam 205-*b* may be from a second TRP of base station 105-*b*. In some examples, beams associated with the first TRP may use the SC-FDM waveform 215, and beams associated with the second TRP may use the OFDMA waveform 220. A TRP may, in some cases, be an example of a small cell controlled by base station 105-*a*. The TRPs of base station 105-*a* may be separate physical devices which may be dispersed within the wireless communications system 200 to improve coverage.

In some cases, base station 105-*a* may use the same waveform for beams in a beam group. For example, each beam in a first beam group may use a first waveform, and each beam in a second beam group may use a second waveform. For example, base station beam 205-*a* may be included in a first beam group, where each base station beam 205 in the first beam group uses an SC-FDM waveform 215. In some cases, each beam which uses the same UE transmit/receive filtering may share the same waveform. In some cases, beams which are quasi co-located (QCL) together may use the same waveform. For example, beams which share a transmission/reception filter may be QCLed of type D (e.g., and may use a same waveform).

Base station 105-*a* may transmit an indication to UE 115-*a* of which waveform is used for a beam or group of beams. Base station 105-*a* may determine the waveform for each beam based on measurements taken at base station 105-*a*, based on feedback provided by served UEs 115 (e.g., including UE 115-*a*), or both. For example, UE 115-*a* may transmit feedback 225 to base station 105-*a*. The feedback 225 may include, for example, measurements of delay spread and frequency selectivity per beam. In some cases, UE 115-*a* may transmit an indication of its capability (e.g., UE capability). The UE capability may be associated with a property of the power amplifier at UE 115-*a*. In some examples, UE 115-*a* may indicate a recommendation of a waveform for each beam. For example, UE 115-*a* may transmit an indication which recommends to use an SC-FDM waveform 215 for base station beam 205-*a* and recommends to use an OFDMA waveform 220 for base station beam 205-*b*. The recommendation may, in some cases, be one bit per beam or per beam group, for example, where a '0' may indicate a suggestion to use the SC-FDM waveform 215 and a '1' may indicate a suggestion to use the OFDMA waveform 220, or vice versa.

Figure 3:
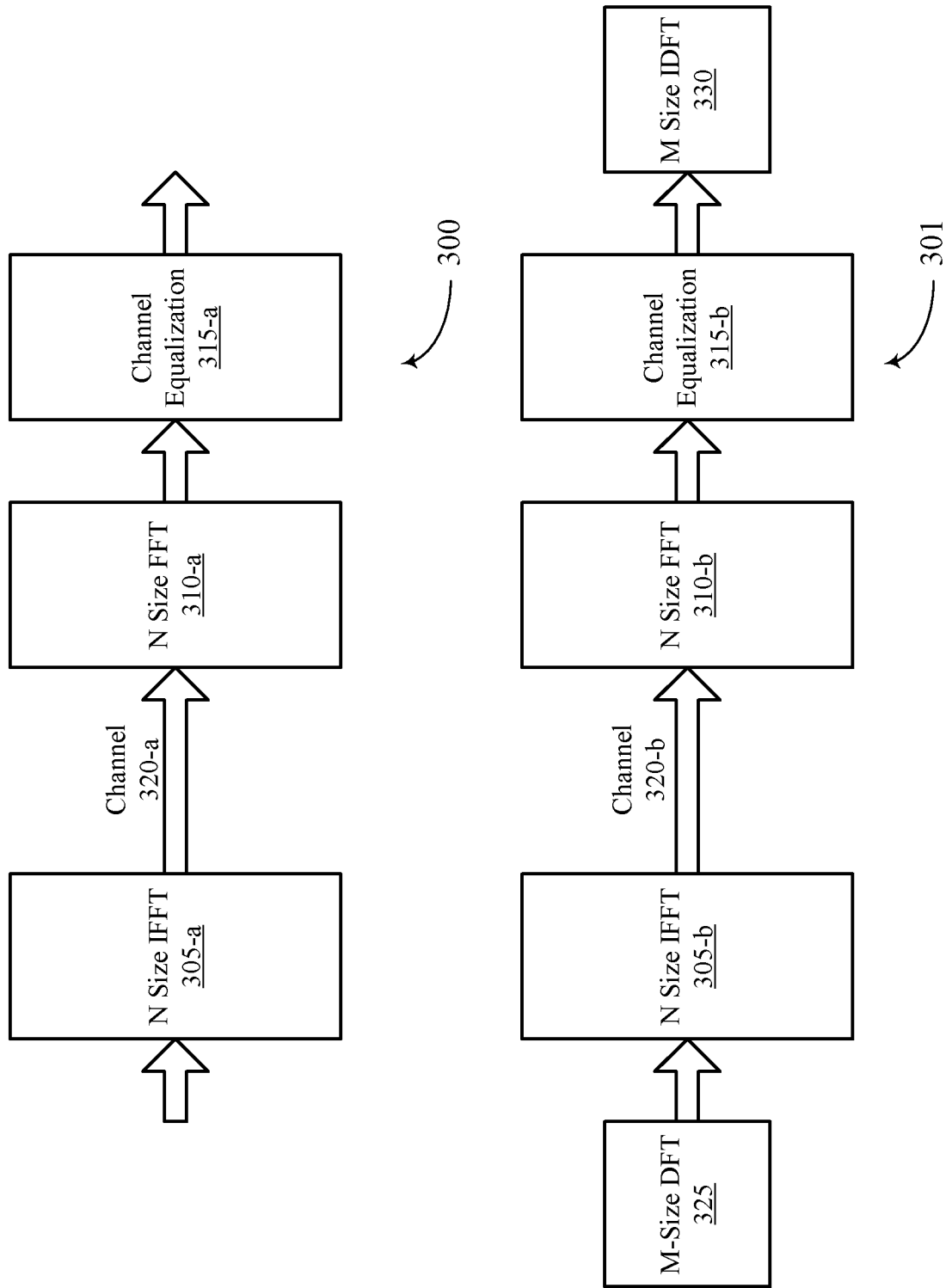
FIG. 3 illustrates examples of waveform generation in accordance with aspects of the present disclosure.

FIG. 3 illustrates examples of waveform generation flows 300 and 301 that support per beam waveform selection in accordance with aspects of the present disclosure. In some examples, the waveform generation flows 300 and 301 may implement aspects of wireless communication system 100.

Waveform generation flow 300 may be an example of an OFDMA waveform generation flow. The waveform generation flow 300 may include an N-Size inverse fast Fourier transform (IFFT) 305-*a* (e.g., an IDFT) which is performed at the transmitter. The transmitter then transmits the signal with the OFDMA waveform over wireless channel 320-*a* to a receiver. To decode the signal with the OFDMA waveform, the receiver may perform N Size FFT 310-*a* (e.g., a DFT). The receiver may then perform channel equalization 315-*a*.

In comparison, the waveform generation flow 301 may have slightly increased complexity. To generate a signal with an SC-FDM waveform, the transmitter may perform an M-Size DFT 325 before performing the N Size IFFT 305-*b*. Performing the M-Size DFT 325 may result in a lower PAPR for the signal with the SC-FDM waveform when compared to an OFDMA waveform. The transmitter may then send the signal with the SC-FDM waveform over wireless channel 320-*b*. The receiver may perform N-size FFT 310-*b* and channel equalization 315-*b*. Then, the receiver may perform an M-size IDFT 330.

As described herein, in some cases a base station 105 may use two different waveforms for downlink transmissions to a UE 115 on two different beams. For example, a first beam of the base station 105 may use an OFDMA waveform as generated by the waveform generation flow 300. A second beam of the base station 105 may use an SC-FDM waveform as generated by the waveform generation flow 301.

Figure 4:
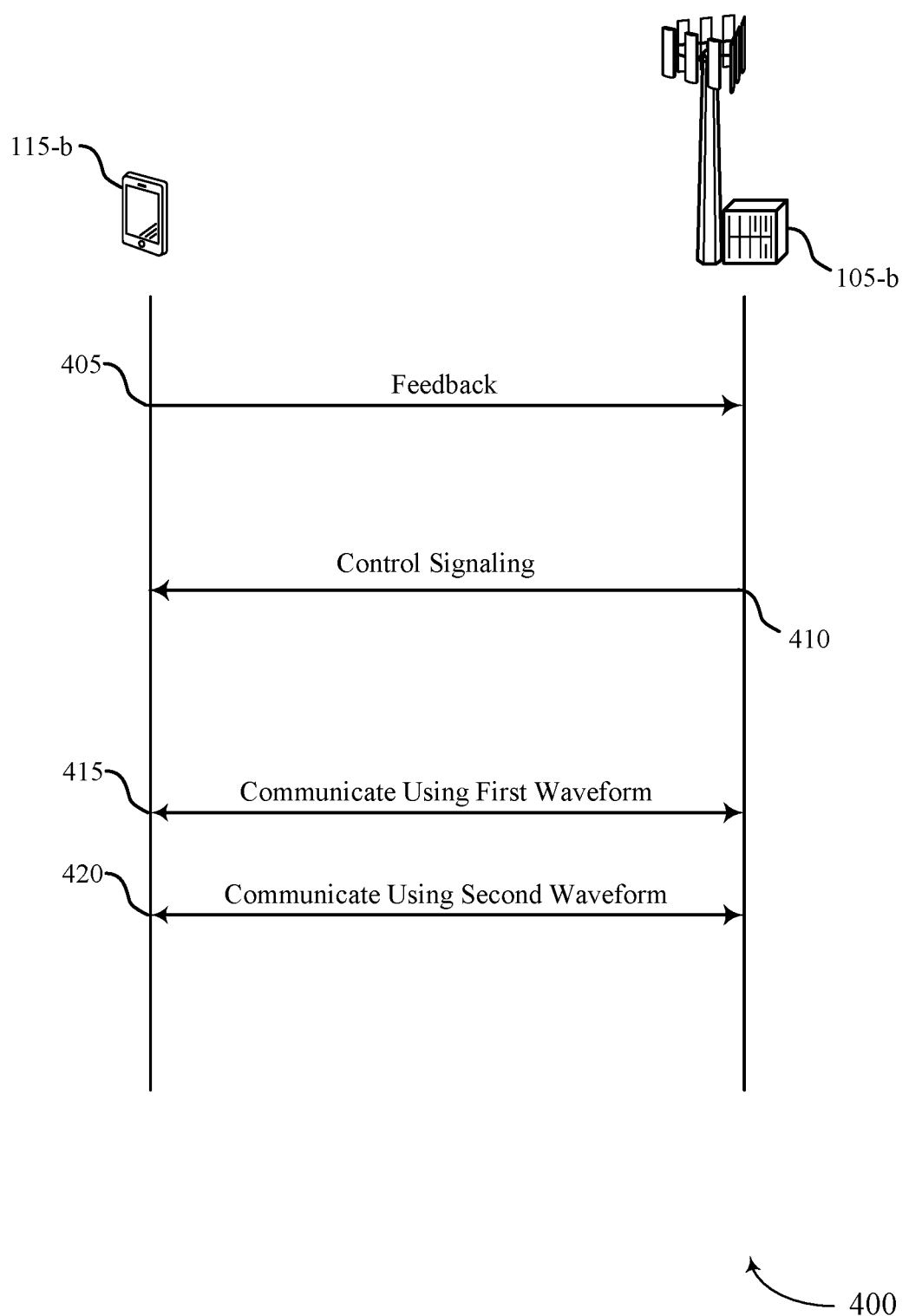
FIG. 4 illustrates an example of a process flow in accordance with aspects of the present disclosure.

FIG. 4 illustrates an example of process flow 400 that supports per beam waveform selection in accordance with aspects of the present disclosure. In some examples, process flow 400 may implement aspects of wireless communication system 100. The process flow 400 may include UE 115-*b* and base station 105-*b*, which may be respective examples of a UE 115 and a base station 105 described with reference to FIG. 1.

In some cases, at 405, UE 115-*b* may transmit feedback information to base station 105-*b*. The feedback information may be, for example, delay spread information per beam or capability information for UE 115-*b*. In some cases, frequency selectivity may be determined based on delay spread. Therefore, in some cases, UE 115-*b* may identify frequency selectivity for shared channels on each of the beams. UE 115-*b* may, in some cases, recommend a waveform for the one or more beams based on channel characteristics of the one or more beams.

Base station 105-*b* may determine a first waveform for communicating via a first beam and a second waveform for communicating via second beam. In some cases, the first waveform and the second waveform may be determined based on the feedback from UE 115-*b*. For example, the waveforms may be selected based on frequency selectivity characteristics of shared channels communicated on the beams.

At 410, UE 115-*b* may receive, from base station 105-*b*, control signaling configuring UE 115-*b* to use the first waveform via the first beam and a second waveform for communicating via the second beam, the first waveform being different than the second waveform. In an example, the first beam may have frequency selective fading, while the second beam may have flat fading. Therefore, the control signaling may configure UE 115-*a* to use an OFDMA waveform for communicating data transmissions on the first beam and to use an SC-FDM waveform for communicating data transmissions on the second beam.

At 415, UE 115-*a* may communicate a first data transmission via the first beam using the first waveform. At 420, UE 115-*a* may communicate a second data transmission via the second beam using the second waveform. In some cases, the first data transmission and the second data transmission may be communicated simultaneously. Or, in some cases, the first waveform and the second waveform may be configured at the same time, such that UE 115-*a* is capable of communicating using the first waveform and the second waveform at the same time. Therefore, UE 115-*a* may not have to be reconfigured between using the first waveform and the second waveform. These techniques may support a UE 115, such as UE 115-*b*, to communicate using an efficient waveform on a per-beam basis.

Figure 5:
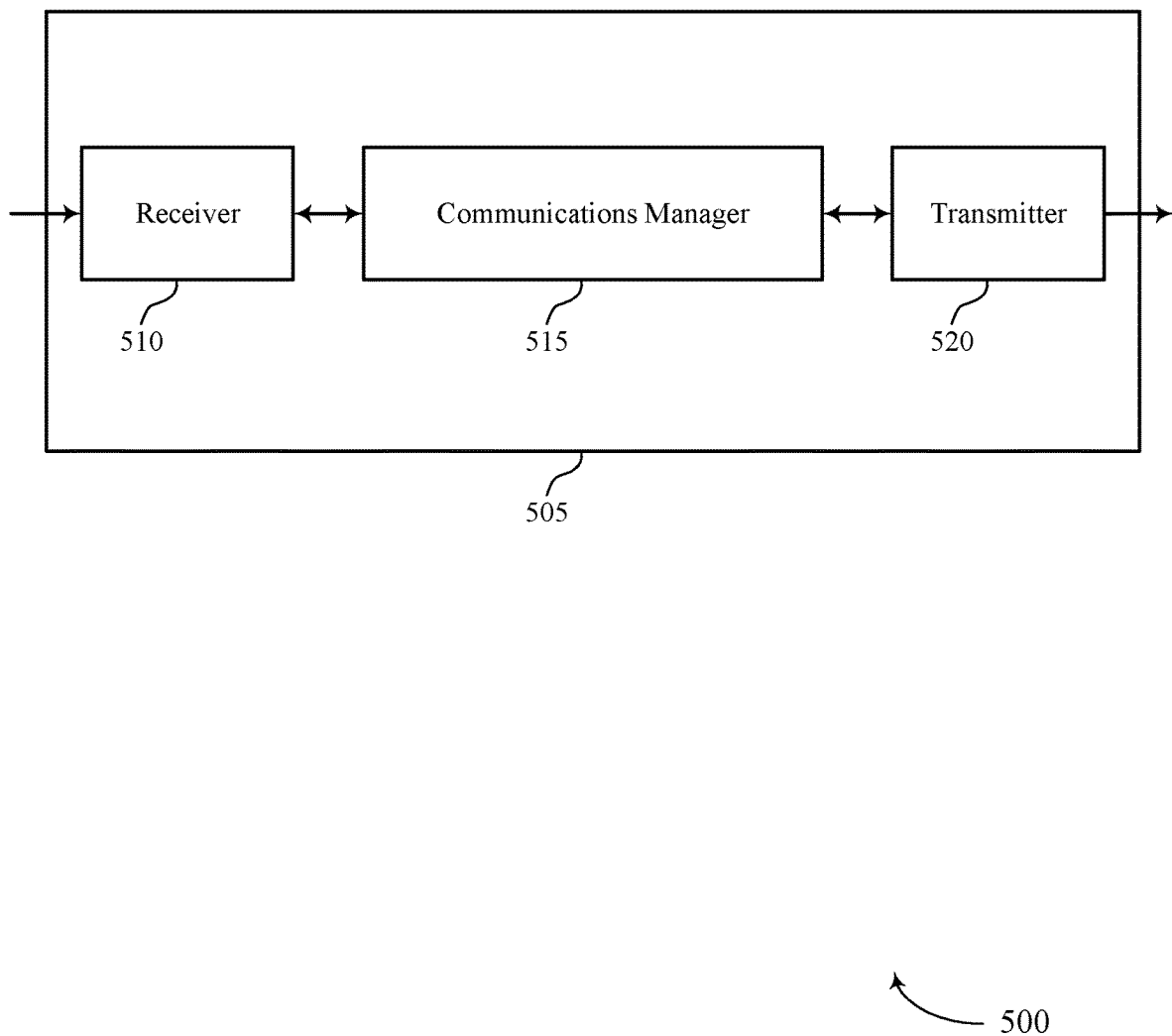
FIGS. 5 and 6 show block diagrams of devices in accordance with aspects of the present disclosure.

FIG. 5 shows a block diagram 500 of a device 505 that supports per beam waveform selection in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to per beam waveform selection, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, control signaling configuring the UE to use a first waveform for communicating via a first beam and a second waveform for communicating via a second beam, the first waveform being different than the second waveform, communicate a first data transmission via the first beam using the first waveform, and communicate a second data transmission via the second beam using the second waveform. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 515 as described herein may be implemented to realize one or more potential advantages. One implementation may allow a UE 115 to use an efficient waveform for data transmissions. For example, if the data channel has flat channel fading, a base station 105 may transmit shared channel messages (e.g., data messages) to the UE 115 using an SC-FDM waveform. The SC-FDM waveform may have a lower PAPR than an OFDM waveform, which may lead to a higher average transmit power than an OFDMA waveform.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
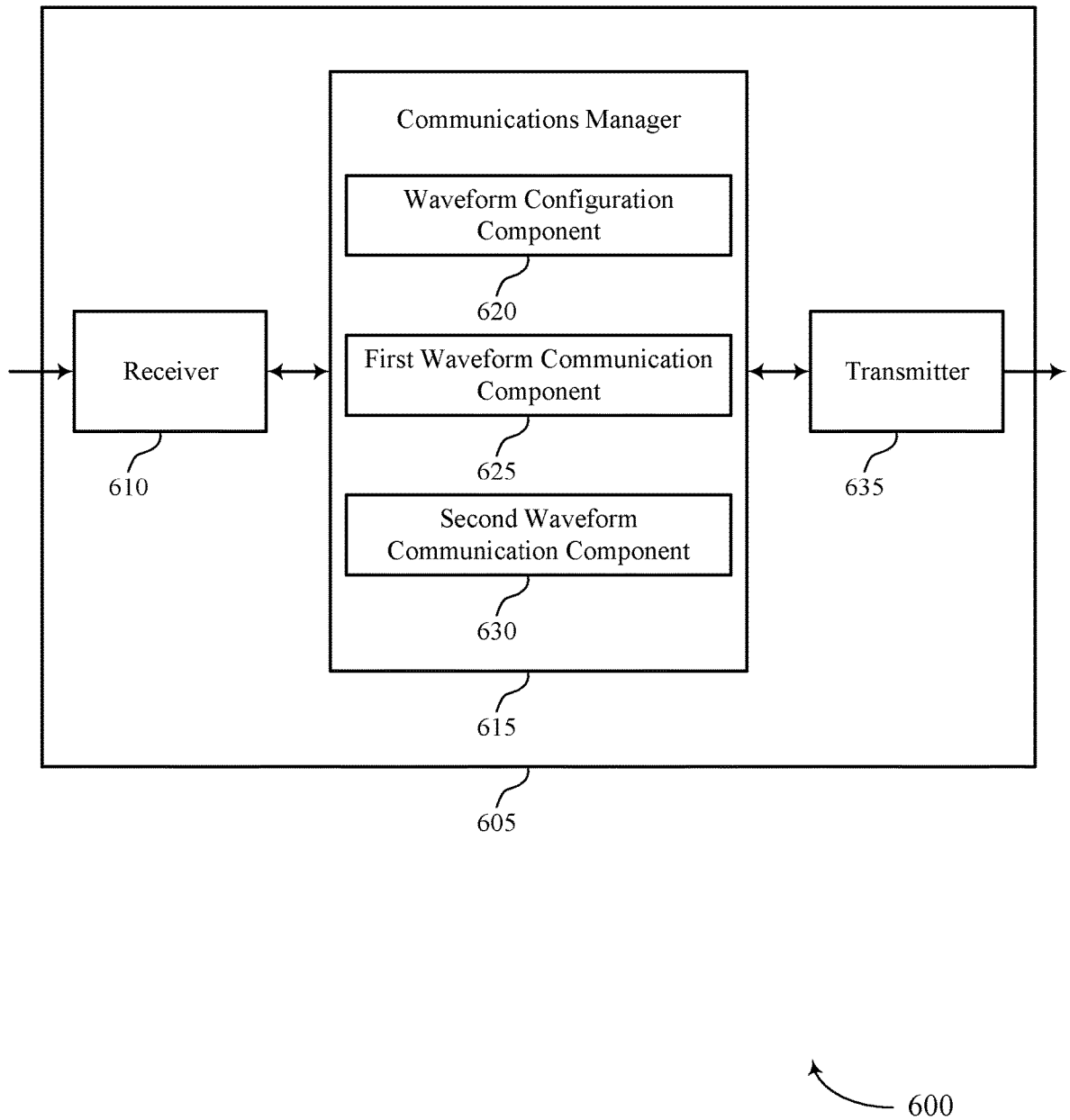

FIG. 6 shows a block diagram 600 of a device 605 that supports per beam waveform selection in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to per beam waveform selection, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a waveform configuration component 620, a first waveform communication component 625, and a second waveform communication component 630. The communications manager 615 may be an example of aspects of the communications manager 810 described herein.

The waveform configuration component 620 may receive, from a base station, control signaling configuring the UE to use a first waveform for communicating via a first beam and a second waveform for communicating via a second beam, the first waveform being different than the second waveform.

The first waveform communication component 625 may communicate a first data transmission via the first beam using the first waveform. The second waveform communication component 630 may communicate a second data transmission via the second beam using the second waveform.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
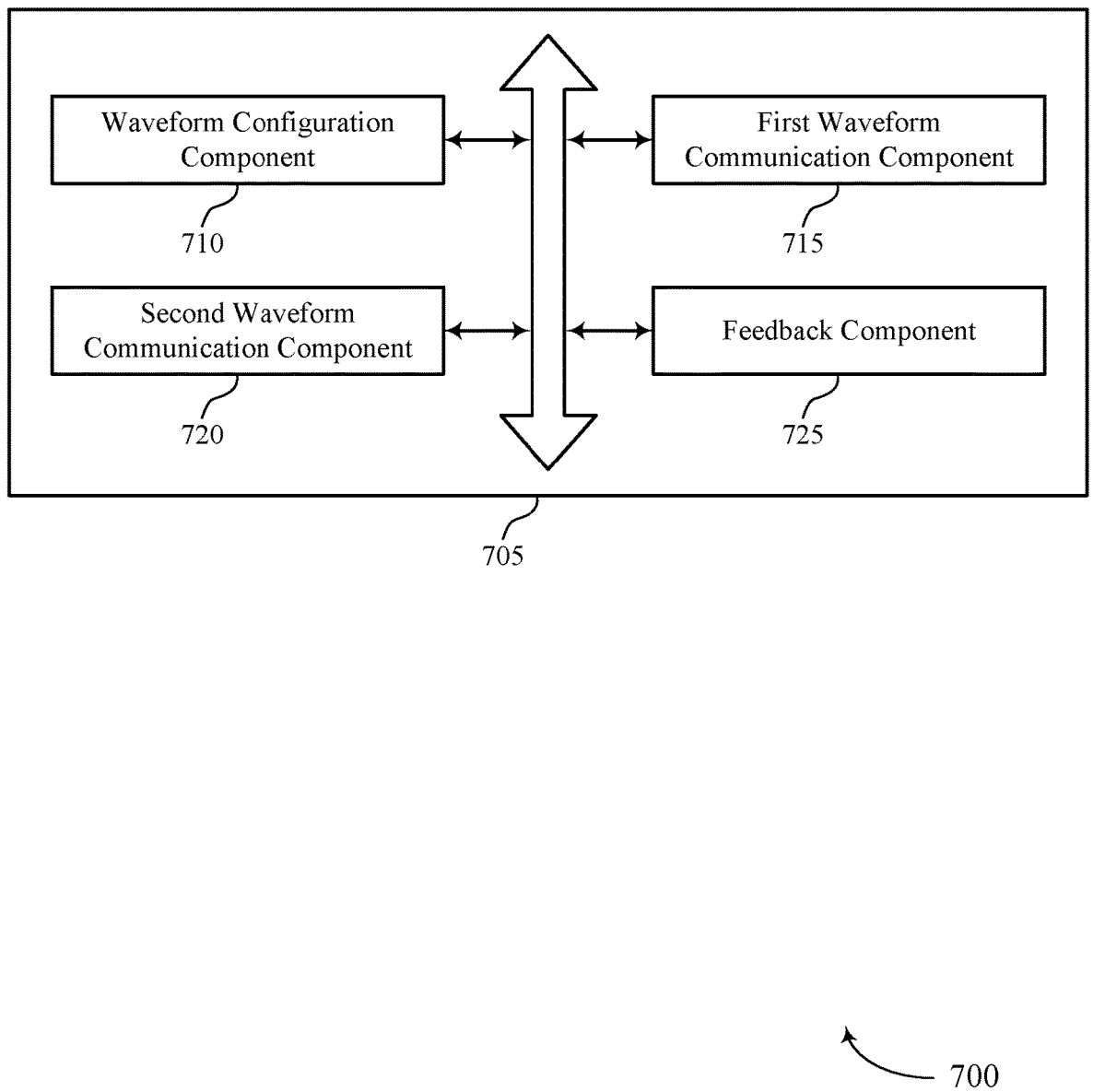
FIG. 7 shows a block diagram of a communications manager in accordance with aspects of the present disclosure.

FIG. 7 shows a block diagram 700 of a communications manager 705 that supports per beam waveform selection in accordance with aspects of the present disclosure. The communications manager 705 may be an example of aspects of a communications manager 515, a communications manager 615, or a communications manager 810 described herein. The communications manager 705 may include a waveform configuration component 710, a first waveform communication component 715, a second waveform communication component 720, and a feedback component 725. Each of these modules may communicate, directly or indirectly, with one another (e.g., via one or more buses).

The waveform configuration component 710 may receive, from a base station, control signaling configuring the UE to use a first waveform for communicating via a first beam and a second waveform for communicating via a second beam, the first waveform being different than the second waveform.

In some examples, the waveform configuration component 710 may receive the control signaling that indicates a first TCI state for the first beam and a second TCI state for the second beam. In some cases, the control signaling is downlink control information, radio resource control signaling, a MAC CE, or any combination thereof. In some cases, the UE concurrently communicates the first data transmission via the first beam and the second data transmission via the second beam. In some cases, the first waveform is a orthogonal frequency division multiplexing waveform or a single carrier frequency division multiplexing waveform. In some cases, the second waveform is a orthogonal frequency division multiplexing waveform or a single carrier frequency division multiplexing waveform.

The first waveform communication component 715 may communicate a first data transmission via the first beam using the first waveform. In some examples, the first waveform communication component 715 may communicate using the first waveform via a first beam group including a first set of beams. In some examples, the first waveform communication component 715 may receive, via a first antenna panel of the UE, the first data transmission via the first beam using the first waveform, where the second data transmission is received via a second antenna panel of the UE that differs from the first antenna panel.

The second waveform communication component 720 may communicate a second data transmission via the second beam using the second waveform. In some examples, the second waveform communication component 720 may communicate using the second waveform via a second beam group including a second set of beams.

In some examples, the second waveform communication component 720 may receive, from the base station, a configuration for the first beam group and the second beam group. In some cases, each beam associated with a TRP of the base station is associated with either the first waveform and the first beam group or the second waveform and the second beam group. In some cases, each beam associated with an antenna panel at the UE are associated with either the first waveform and the first beam group or the second waveform and the second beam group. In some cases, each beam associated with a transmission/reception spatial filter at the UE are associated with either the first waveform and the first beam group or the second waveform and the second beam group.

The feedback component 725 may transmit feedback information to the base station, where the control signaling is received based on the feedback information. In some examples, the feedback component 725 may transmit the feedback information that indicates a delay spread measurement, a frequency selectivity per beam parameter, a UE capability, a power amplifier capability, a waveform recommendation, or any combination thereof.

Figure 8:
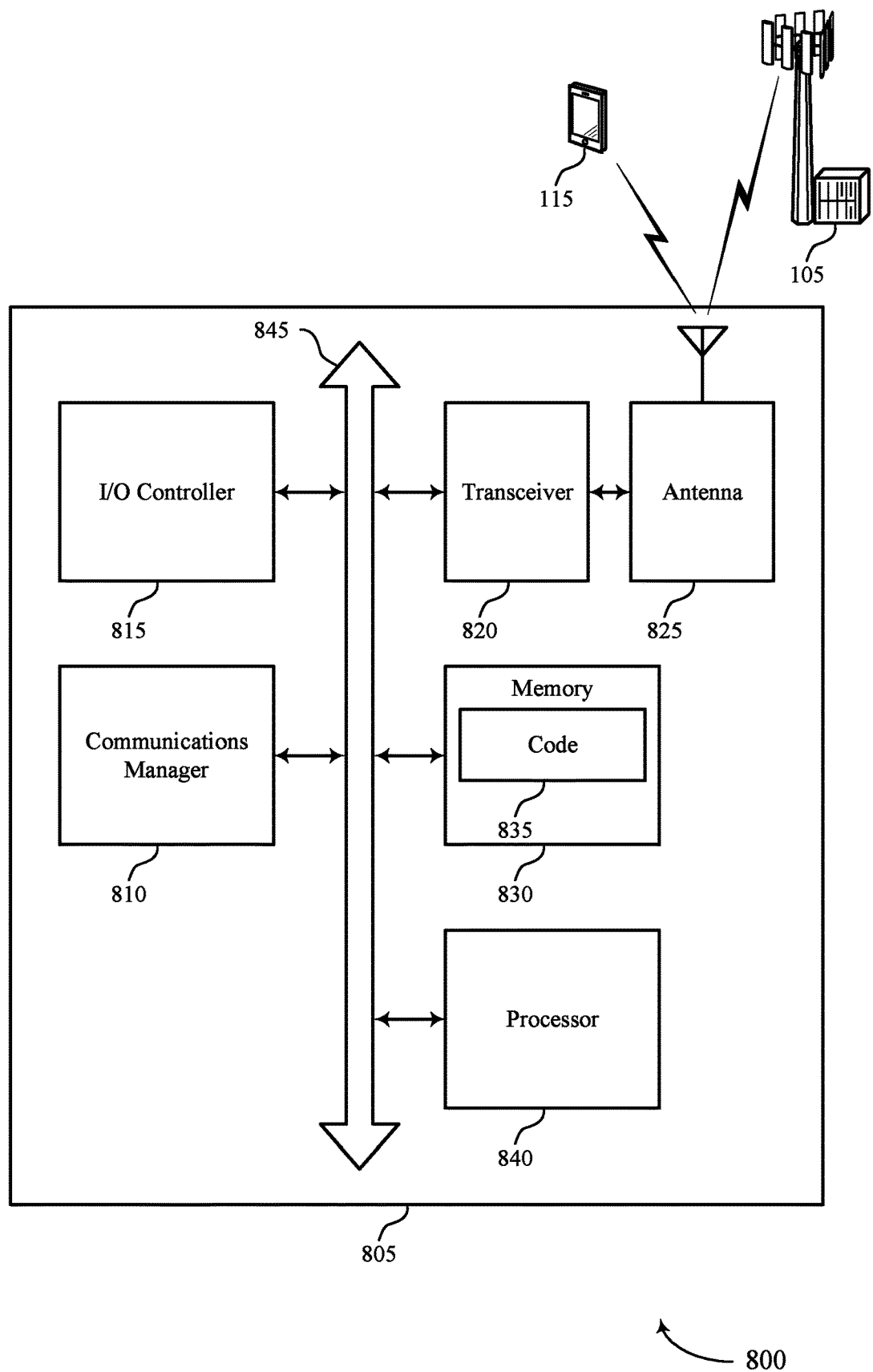
FIG. 8 shows a diagram of a system including a device in accordance with aspects of the present disclosure.

FIG. 8 shows a diagram of a system 800 including a device 805 that supports per beam waveform selection in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, control signaling configuring the UE to use a first waveform for communicating via a first beam and a second waveform for communicating via a second beam, the first waveform being different than the second waveform, communicate a first data transmission via the first beam using the first waveform, and communicate a second data transmission via the second beam using the second waveform.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting per beam waveform selection).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
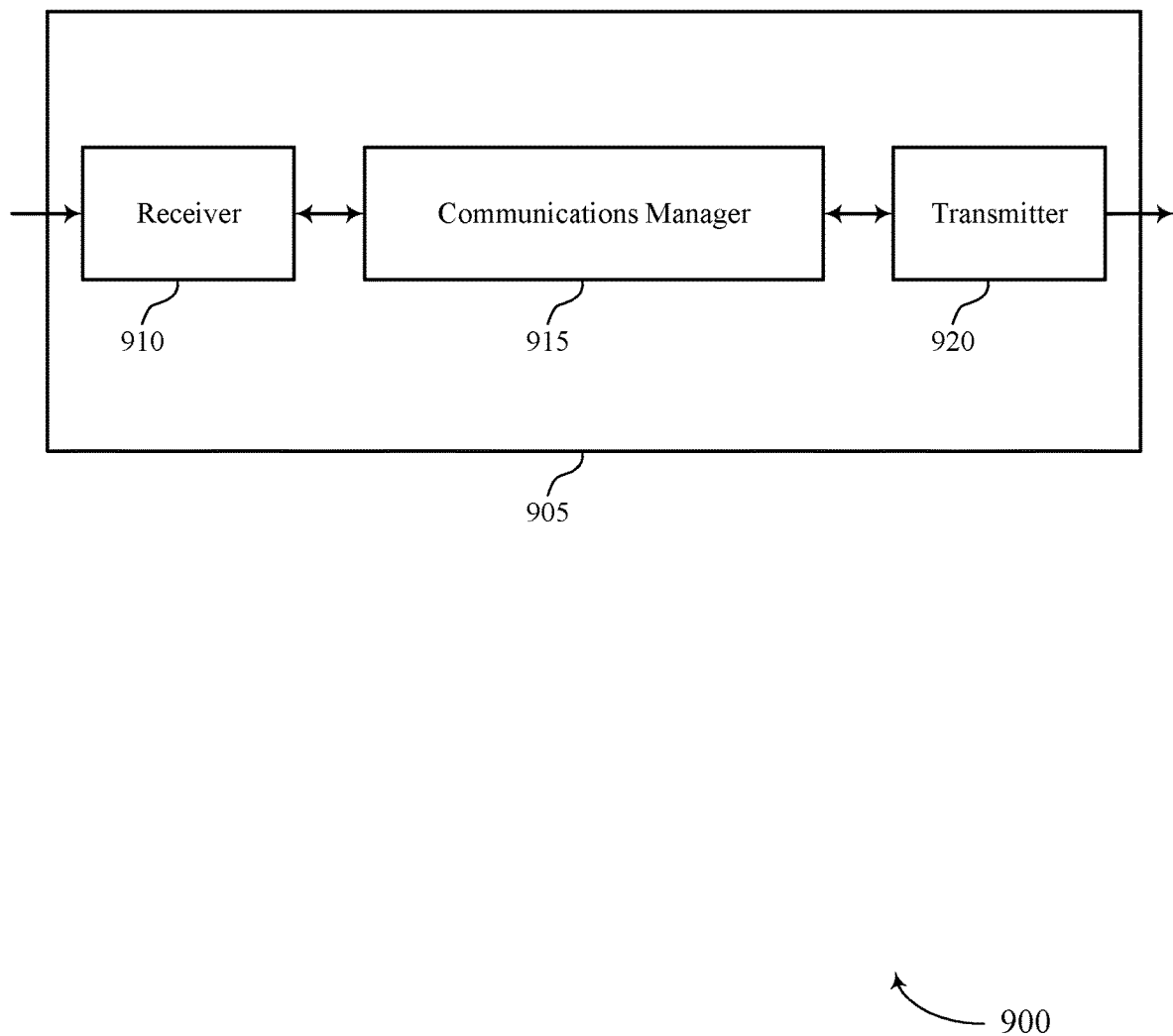
FIGS. 9 and 10 show block diagrams of devices in accordance with aspects of the present disclosure.

FIG. 9 shows a block diagram 900 of a device 905 that supports per beam waveform selection in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to per beam waveform selection, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit control signaling to configure a UE to use a first waveform for communicating via a first beam and a second waveform for communicating via a second beam, the first waveform being different than the second waveform, communicate a first data transmission via the first beam using the first waveform, and communicate a second data transmission via the second beam using the second waveform. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
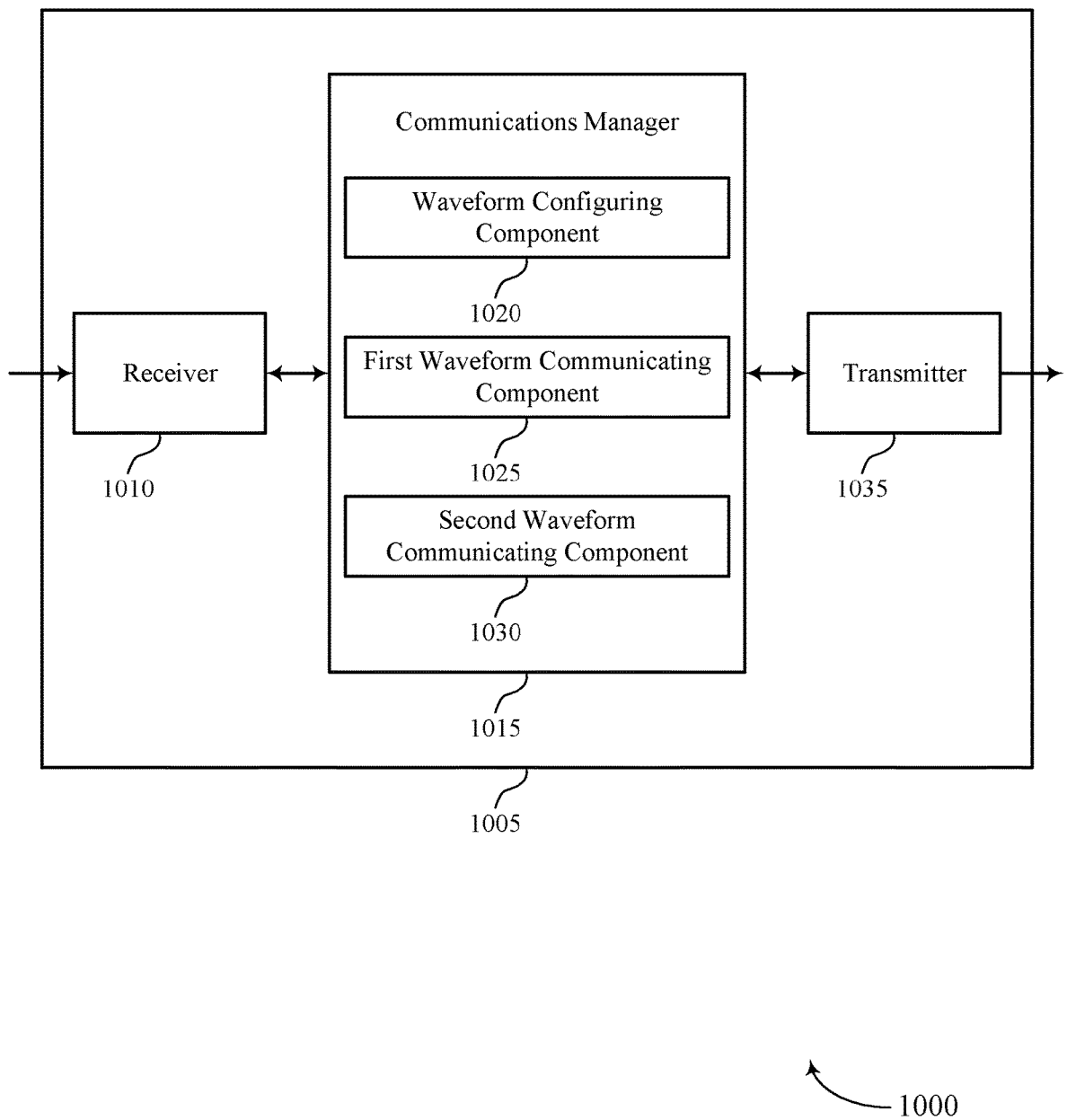

FIG. 10 shows a block diagram 1000 of a device 1005 that supports per beam waveform selection in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to per beam waveform selection, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a waveform configuring component 1020, a first waveform communicating component 1025, and a second waveform communicating component 1030. The communications manager 1015 may be an example of aspects of the communications manager 1210 described herein.

The waveform configuring component 1020 may transmit control signaling to configure a UE to use a first waveform for communicating via a first beam and a second waveform for communicating via a second beam, the first waveform being different than the second waveform. The first waveform communicating component 1025 may communicate a first data transmission via the first beam using the first waveform. The second waveform communicating component 1030 may communicate a second data transmission via the second beam using the second waveform.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
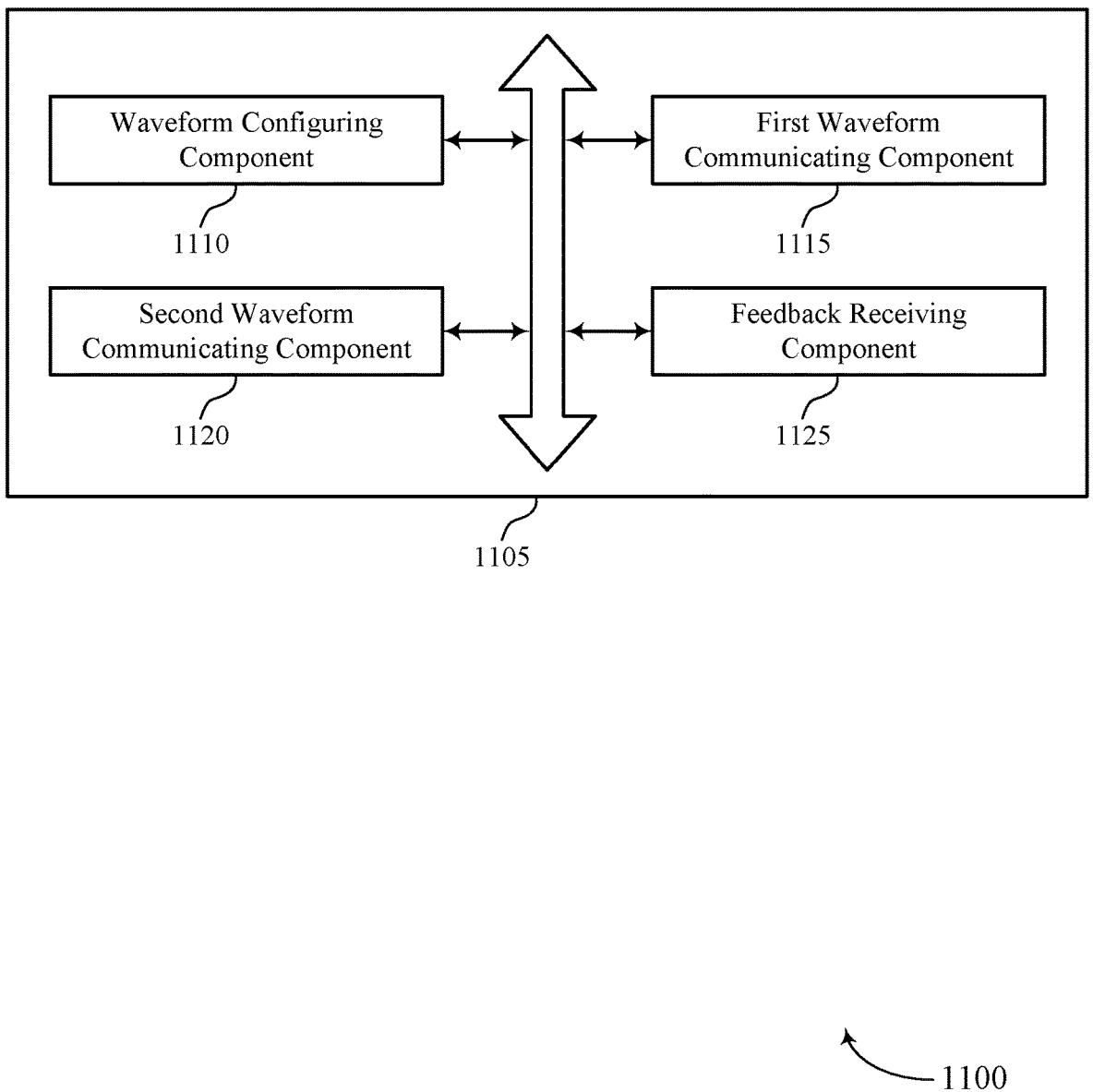
FIG. 11 shows a block diagram of a communications manager in accordance with aspects of the present disclosure.

FIG. 11 shows a block diagram 1100 of a communications manager 1105 that supports per beam waveform selection in accordance with aspects of the present disclosure. The communications manager 1105 may be an example of aspects of a communications manager 915, a communications manager 1015, or a communications manager 1210 described herein. The communications manager 1105 may include a waveform configuring component 1110, a first waveform communicating component 1115, a second waveform communicating component 1120, and a feedback receiving component 1125. Each of these modules may communicate, directly or indirectly, with one another (e.g., via one or more buses).

The waveform configuring component 1110 may transmit control signaling to configure a UE to use a first waveform for communicating via a first beam and a second waveform for communicating via a second beam, the first waveform being different than the second waveform. In some examples, the waveform configuring component 1110 may transmit the control signaling that indicates a first TCI state for the first beam and a second TCI state for the second beam.

In some cases, the base station concurrently communicates the first data transmission via the first beam and the second data transmission via the second beam. In some cases, the control signaling is downlink control information, radio resource control signaling, a MAC CE, or any combination thereof. In some cases, the first waveform is a orthogonal frequency division multiplexing waveform or a single carrier frequency division multiplexing waveform. In some cases, the second waveform is a orthogonal frequency division multiplexing waveform or a single carrier frequency division multiplexing waveform.

The first waveform communicating component 1115 may communicate a first data transmission via the first beam using the first waveform. In some examples, the first waveform communicating component 1115 may communicate using the first waveform via a first beam group including a first set of beams.

The second waveform communicating component 1120 may communicate a second data transmission via the second beam using the second waveform. In some examples, the second waveform communicating component 1120 may communicate using the second waveform via a second beam group including a second set of beams.

In some examples, the second waveform communicating component 1120 may transmit, to the UE, a configuration for the first beam group and the second beam group. In some cases, each beam associated with a TRP of the base station is associated with either the first waveform and the first beam group or the second waveform and the second beam group. In some cases, each beam associated with an antenna panel at the UE are associated with either the first waveform and the first beam group or the second waveform and the second beam group. In some cases, each beam associated with a transmission/reception spatial filter at the UE are associated with either the first waveform and the first beam group or the second waveform and the second beam group.

The feedback receiving component 1125 may receive feedback information from the UE, where the control signaling is transmitted based on the feedback information. In some examples, the feedback receiving component 1125 may receive the feedback information that indicates a delay spread measurement, a frequency selectivity per beam parameter, a UE capability, a power amplifier capability, a waveform recommendation, or any combination thereof.

Figure 12:
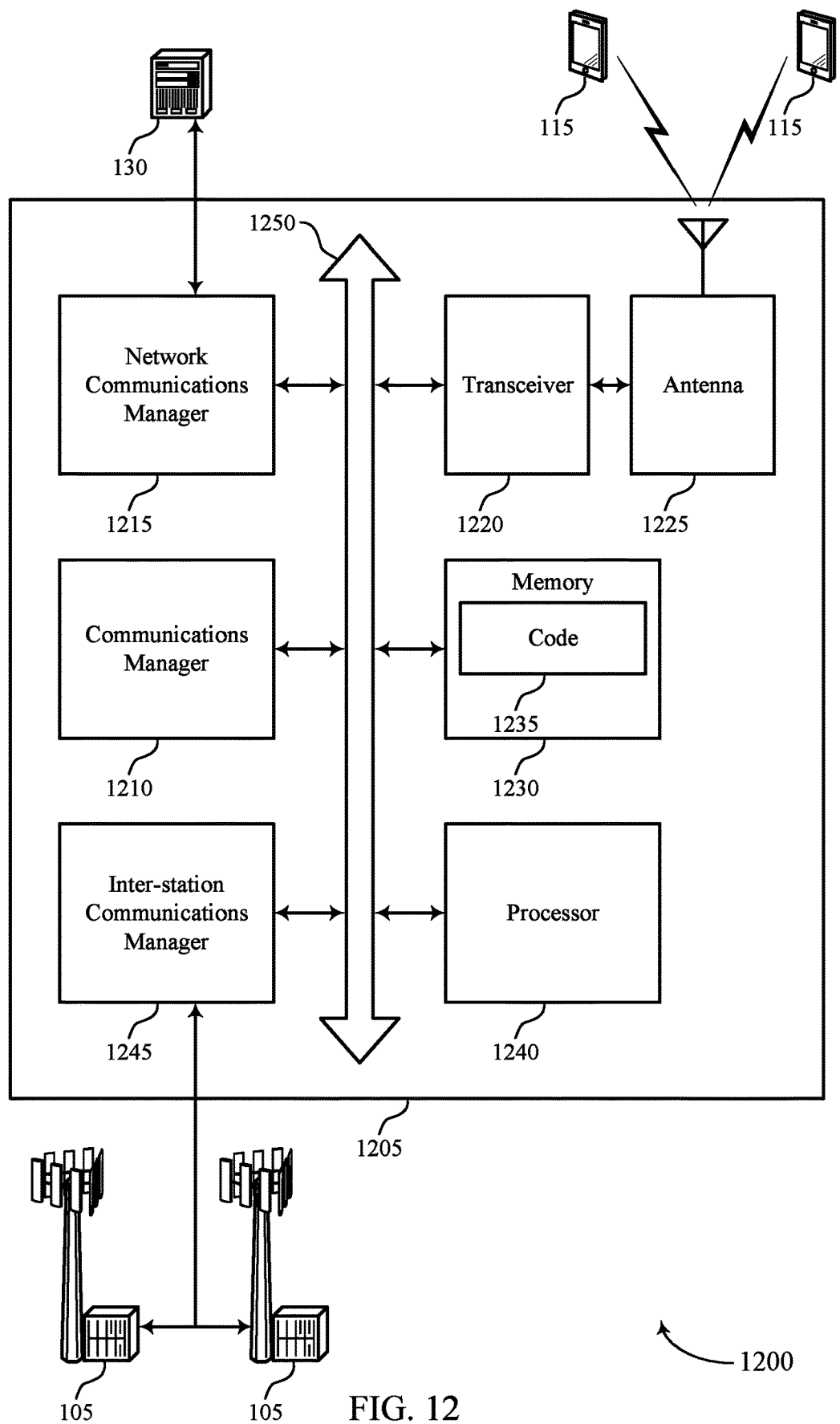
FIG. 12 shows a diagram of a system including a device in accordance with aspects of the present disclosure.

FIG. 12 shows a diagram of a system 1200 including a device 1205 that supports per beam waveform selection in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit control signaling to configure a UE to use a first waveform for communicating via a first beam and a second waveform for communicating via a second beam, the first waveform being different than the second waveform, communicate a first data transmission via the first beam using the first waveform, and communicate a second data transmission via the second beam using the second waveform.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting per beam waveform selection).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The actions performed by the communications manager 1210 as described herein may be implemented to realize one or more potential advantages at components of the device 1205. For example, by supporting different waveforms for data transmissions on different beams, the processor 1240 may configure a power amplifier to perform fewer power backoffs when transmitting the downlink data transmissions. This may improve power efficiencies at the device.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
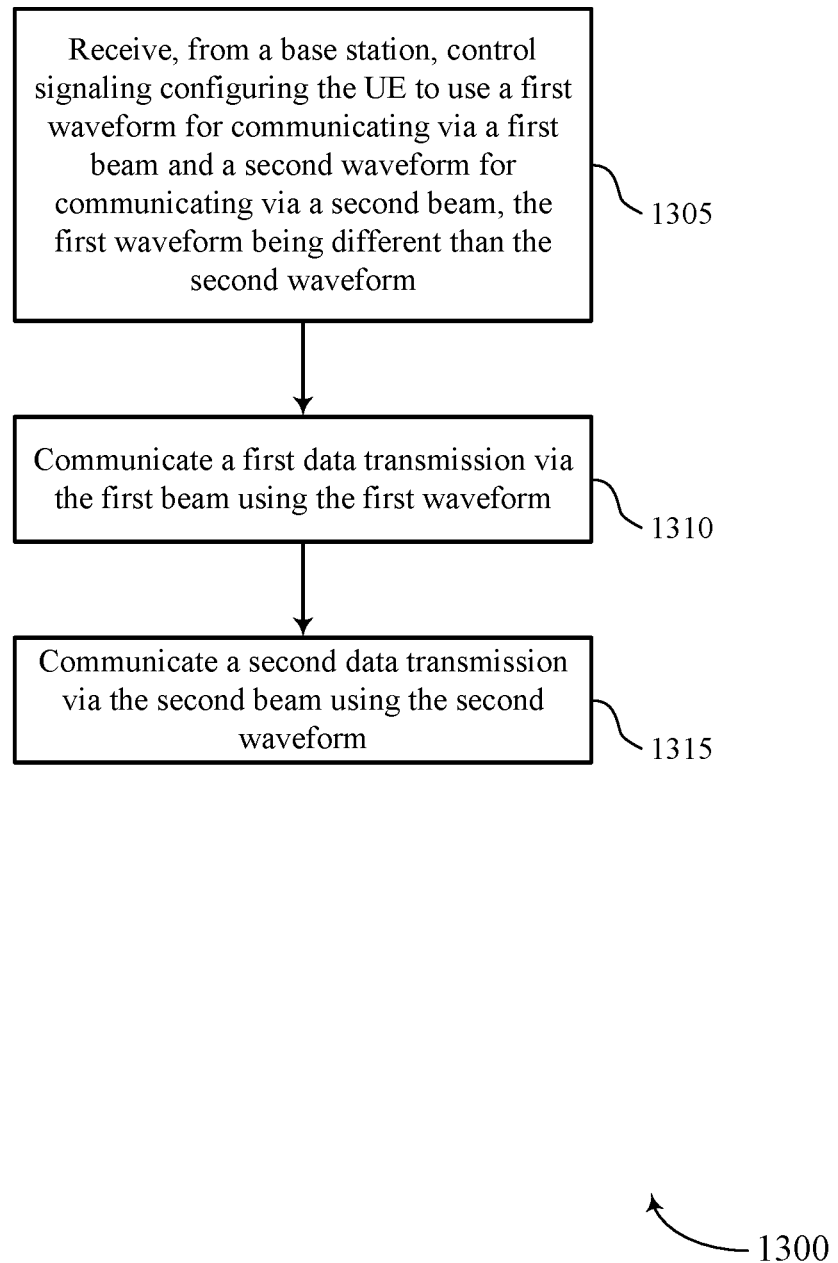
FIGS. 13 through 15 show flowcharts illustrating methods in accordance with aspects of the present disclosure.

FIG. 13 shows a flowchart illustrating a method 1300 that supports per beam waveform selection in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, control signaling configuring the UE to use a first waveform for communicating via a first beam and a second waveform for communicating via a second beam, the first waveform being different than the second waveform. The operations of 1305 may be performed according to the methods described herein. In some examples, aspects of the operations of 1305 may be performed by a waveform configuration component as described with reference to FIGS. 5 through 8.

At 1310, the UE may communicate a first data transmission via the first beam using the first waveform. The operations of 1310 may be performed according to the methods described herein. In some examples, aspects of the operations of 1310 may be performed by a first waveform communication component as described with reference to FIGS. 5 through 8.

At 1315, the UE may communicate a second data transmission via the second beam using the second waveform. The operations of 1315 may be performed according to the methods described herein. In some examples, aspects of the operations of 1315 may be performed by a second waveform communication component as described with reference to FIGS. 5 through 8.

Figure 14:
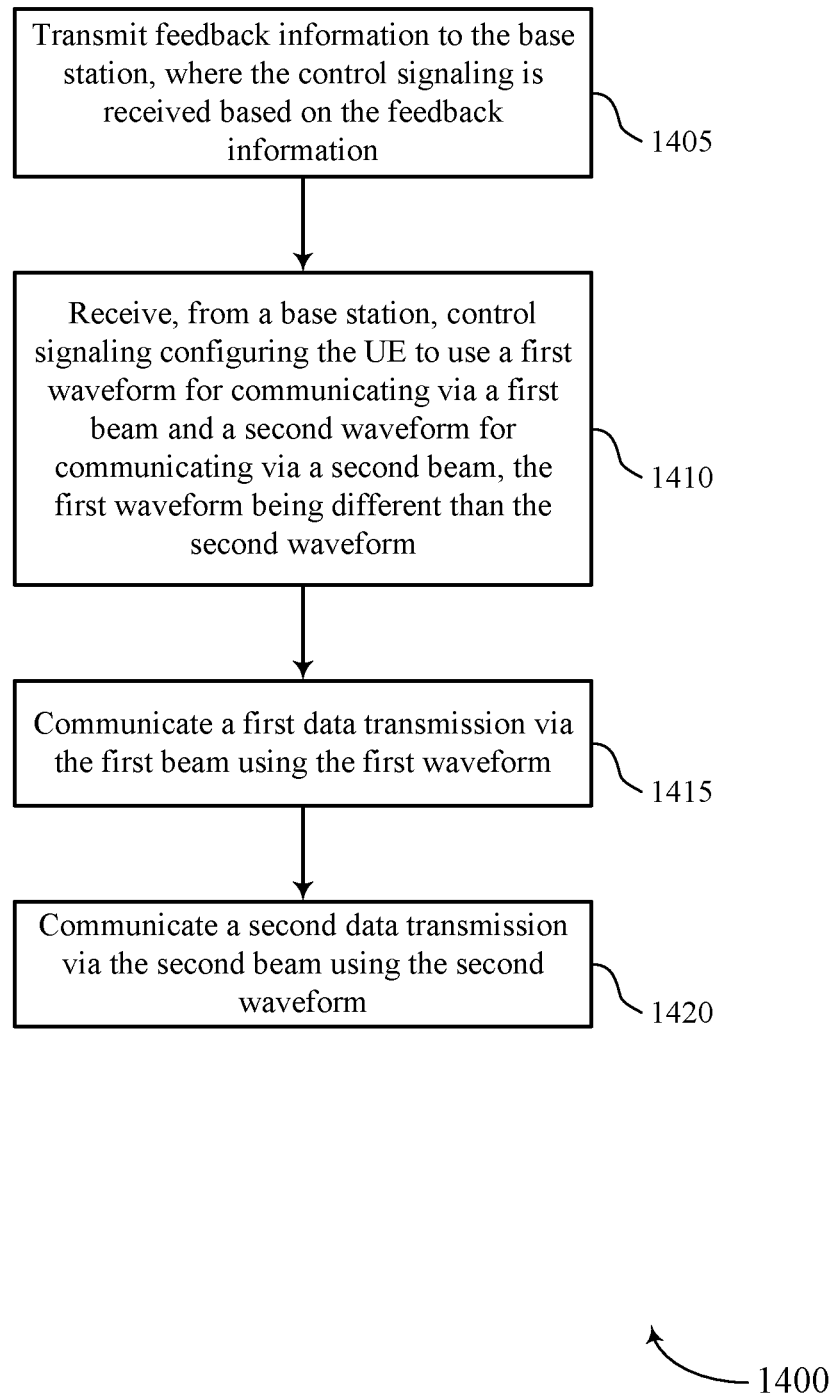

FIG. 14 shows a flowchart illustrating a method 1400 that supports per beam waveform selection in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit feedback information to the base station, where the control signaling is received based on the feedback information. The operations of 1405 may be performed according to the methods described herein. In some examples, aspects of the operations of 1405 may be performed by a feedback component as described with reference to FIGS. 5 through 8.

At 1410, the UE may receive, from a base station, control signaling configuring the UE to use a first waveform for communicating via a first beam and a second waveform for communicating via a second beam, the first waveform being different than the second waveform. The operations of 1410 may be performed according to the methods described herein. In some examples, aspects of the operations of 1410 may be performed by a waveform configuration component as described with reference to FIGS. 5 through 8.

At 1415, the UE may communicate a first data transmission via the first beam using the first waveform. The operations of 1415 may be performed according to the methods described herein. In some examples, aspects of the operations of 1415 may be performed by a first waveform communication component as described with reference to FIGS. 5 through 8.

At 1420, the UE may communicate a second data transmission via the second beam using the second waveform. The operations of 1420 may be performed according to the methods described herein. In some examples, aspects of the operations of 1420 may be performed by a second waveform communication component as described with reference to FIGS. 5 through 8.

Figure 15:
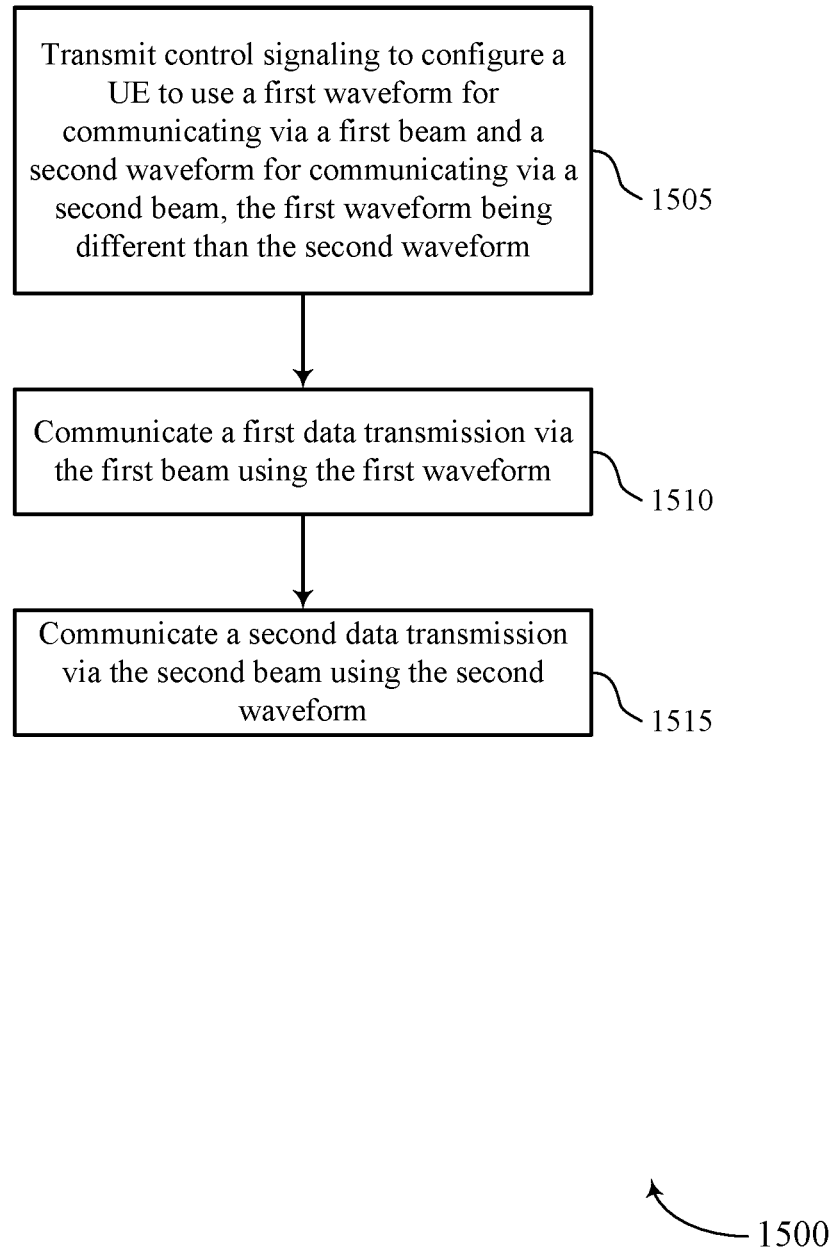

FIG. 15 shows a flowchart illustrating a method 1500 that supports per beam waveform selection in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit control signaling to configure a UE to use a first waveform for communicating via a first beam and a second waveform for communicating via a second beam, the first waveform being different than the second waveform. The operations of 1505 may be performed according to the methods described herein. In some examples, aspects of the operations of 1505 may be performed by a waveform configuring component as described with reference to FIGS. 9 through 12.

At 1510, the base station may communicate a first data transmission via the first beam using the first waveform. The operations of 1510 may be performed according to the methods described herein. In some examples, aspects of the operations of 1510 may be performed by a first waveform communicating component as described with reference to FIGS. 9 through 12.

At 1515, the base station may communicate a second data transmission via the second beam using the second waveform. The operations of 1515 may be performed according to the methods described herein. In some examples, aspects of the operations of 1515 may be performed by a second waveform communicating component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    receiving, from a base station, control signaling configuring the UE to use a first waveform for communicating via a first beam group comprising a first plurality of beams and a second waveform for communicating via a second beam group comprising a second plurality of beams, the first waveform being different than the second waveform;
    receiving, via a first antenna panel of the UE, a first data transmission via a first beam of the first plurality of beams using the first waveform; and
    receiving, via a second antenna panel of the UE, a second data transmission via a second beam of the second plurality of beams using the second waveform,
    wherein the second antenna panel differs from the first antenna panel.

2. The method of claim 1, further comprising:
    receiving, from the base station, a configuration for the first beam group and the second beam group.

3. The method of claim 1, wherein each beam associated with a transmission reception point (TRP) of the base station is associated with either the first waveform and the first beam group or the second waveform and the second beam group.

4. The method of claim 1, wherein each beam associated with an antenna panel at the UE are associated with either the first waveform and the first beam group or the second waveform and the second beam group.

5. The method of claim 1, wherein each beam associated with a transmission/reception spatial filter at the UE are associated with either the first waveform and the first beam group or the second waveform and the second beam group.

6. The method of claim 1, wherein receiving the control signaling comprises:
    receiving the control signaling that indicates a first transmission configuration indicator (TCI) state for the first beam and a second TCI state for the second beam.

7. The method of claim 1, further comprising:
    transmitting feedback information to the base station, wherein the control signaling is received based at least in part on the feedback information.

8. The method of claim 7, wherein transmitting the feedback information comprises:
    transmitting the feedback information that indicates a delay spread measurement, a frequency selectivity per beam parameter, a UE capability, a power amplifier capability, a waveform recommendation, or any combination thereof.

9. The method of claim 1, wherein the control signaling is downlink control information, radio resource control signaling, a medium access control (MAC) control element (CE), or any combination thereof.

10. The method of claim 1, wherein the UE concurrently receives the first data transmission via the first beam and the second data transmission via the second beam.

11. The method of claim 1, wherein the first waveform is a orthogonal frequency division multiplexing waveform or a single carrier frequency division multiplexing waveform.

12. The method of claim 1, wherein the second waveform is a orthogonal frequency division multiplexing waveform or a single carrier frequency division multiplexing waveform.

13. A method for wireless communications by a base station, comprising:
    transmitting control signaling to configure a user equipment (UE) to use a first waveform for communicating via a first beam group comprising a first plurality of beams and a second waveform for communicating via a second beam group comprising a second plurality of beams, the first waveform being different than the second waveform, wherein each beam associated with a transmission reception point (TRP) of the base station is associated with either the first waveform and the first beam group or the second waveform and the second beam group;
    communicating a first data transmission via a first beam of the first plurality of beams using the first waveform; and
    communicating a second data transmission via a second beam of the second plurality of beams using the second waveform.

14. The method of claim 13, further comprising:
    transmitting, to the UE, a configuration for the first beam group and the second beam group.

15. The method of claim 13, wherein each beam associated with an antenna panel at the UE are associated with either the first waveform and the first beam group or the second waveform and the second beam group.

16. The method of claim 13, wherein each beam associated with a transmission/reception spatial filter at the UE are associated with either the first waveform and the first beam group or the second waveform and the second beam group.

17. The method of claim 13, wherein transmitting the control signaling comprises:
    transmitting the control signaling that indicates a first transmission configuration indicator (TCI) state for the first beam and a second TCI state for the second beam.

18. The method of claim 13, wherein the base station concurrently communicates the first data transmission via the first beam and the second data transmission via the second beam.

19. The method of claim 13, further comprising:
    receiving feedback information from the UE, wherein the control signaling is transmitted based at least in part on the feedback information.

20. The method of claim 19, wherein receiving the feedback information comprises:
    receiving the feedback information that indicates a delay spread measurement, a frequency selectivity per beam parameter, a UE capability, a power amplifier capability, a waveform recommendation, or any combination thereof.

21. The method of claim 13, wherein the control signaling is downlink control information, radio resource control signaling, a medium access control (MAC) control element (CE), or any combination thereof.

22. The method of claim 13, wherein the first waveform is a orthogonal frequency division multiplexing waveform or a single carrier frequency division multiplexing waveform.

23. The method of claim 13, wherein the second waveform is a orthogonal frequency division multiplexing waveform or a single carrier frequency division multiplexing waveform.

24. An apparatus for wireless communications by a user equipment (UE), comprising: a processor, memory coupled with the processor; and instructions stored in the memory and executable by the processor to cause the apparatus to:
    receive, from a base station, control signaling configuring the UE to use a first waveform for communicating via a first beam group comprising a first plurality of beams and a second waveform for communicating via a second beam group comprising a second plurality of beams, the first waveform being different than the second waveform;
    receive, via a first antenna panel of the UE, a first data transmission via a first beam of the first plurality of beams using the first waveform; and
    receive, via a second antenna panel of the UE, a second data transmission via a second beam of the second plurality of beams using the second waveform,
    wherein the second antenna panel differs from the first antenna panel.

25. An apparatus for wireless communications by a base station, comprising: a processor, memory coupled with the processor; and instructions stored in the memory and executable by the processor to cause the apparatus to:
    transmit control signaling to configure a user equipment (UE) to use a first waveform for communicating via a first beam group comprising a first plurality of beams and a second waveform for communicating via a second beam group comprising a second plurality of beams, the first waveform being different than the second waveform, wherein each beam associated with a transmission reception point (TRP) of the base station is associated with either the first waveform and the first beam group or the second waveform and the second beam group;
    communicate a first data transmission via a first beam of the first plurality of beams using the first waveform; and
    communicate a second data transmission via a second beam of the second plurality of beams using the second waveform.

* * * * *